United States Patent
Cho (10) Patent No.: US 7,781,092 B2
(45) Date of Patent: Aug. 24, 2010

(54) SECONDARY BATTERY AND METHOD OF MANUFACTURING SAME

(75) Inventor: Sung-Jae Cho, Cheonan (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1053 days.

(21) Appl. No.: 10/735,697

(22) Filed: Dec. 16, 2003

(65) Prior Publication Data

US 2004/0126656 A1 Jul. 1, 2004

(30) Foreign Application Priority Data

Dec. 18, 2002 (KR) .................. 10-2002-0081071
Dec. 26, 2002 (KR) .................. 10-2002-0084073

(51) Int. Cl.
*H01M 2/26* (2006.01)
*H01M 2/04* (2006.01)
*H01M 2/06* (2006.01)

(52) U.S. Cl. .................. 429/121; 429/170; 429/178; 429/179

(58) Field of Classification Search .................. 429/178, 429/179, 181

See application file for complete search history.

(56) References Cited

U.S. PATENT DOCUMENTS 5,139,898 A 8/1992 Schneider et al.

(Continued)

FOREIGN PATENT DOCUMENTS

CN 1166062 11/1997

(Continued)

OTHER PUBLICATIONS

IPDL machine translation of JP07-169506.*
IPDL machine translation of JP2002-334685.*
Korean Office Action of the Korean Patent Publication No. 2002-81071, issued on Oct. 21, 2004 (English translation attached).

(Continued)

*Primary Examiner*—Dah-Wei D Yuan
*Assistant Examiner*—Maria J Laios
(74) *Attorney, Agent, or Firm*—Robert E. Bushnell, Esq.

(57) ABSTRACT

A secondary battery includes an electrode assembly, an electrically conducting metallic can, adapted to accommodate the electrode assembly, and having a side opening, a cap assembly including a cap plate and an electrode port, the cap plate being coupled to the side opening of the can and having at least one aperture in a side portion thereof, the electrode port being coupled to the cap plate and being connected to one of at least two electrode tabs that extend from the electrode assembly, and a lead plate, pressed into the at least one aperture of the cap plate, and connected to a safety device.

36 Claims, 5 Drawing Sheets

U.S. PATENT DOCUMENTS

| | | | | |
|---|---|---|---|---|
| 5,705,290 | A | * | 1/1998 | Azema .......................... 429/53 |
| 6,824,917 | B2 | * | 11/2004 | Aaltonen et al. .............. 429/97 |
| 2003/0077484 | A1 | * | 4/2003 | Cho .............................. 429/7 |

FOREIGN PATENT DOCUMENTS

| | | |
|---|---|---|
| CN | 1241303 | 1/2000 |
| JP | 07-169506 | 7/1995 |
| JP | 08-153510 | 6/1996 |
| JP | 2001-006746 | 1/2001 |
| JP | 2001-035333 | 9/2001 |
| JP | 2002-298828 | 10/2002 |
| JP | 2002-334685 | 11/2002 |
| WO | WO 99/18622 | 4/1999 |

OTHER PUBLICATIONS

Korean Office Action of the Korean Patent Publication No. 2002-84073, issued on Oct. 22, 2004 (English translation attached).

*Registration Determination Certificate* from the Chinese Patent Office issued in Applicant's corresponding Chinese Patent Application No. 200310123917.2 dated Apr. 30, 2008.

Japanese Office action dated Jul. 8, 2008 for corresponding Japanese patent application No. 2003-400086.

* cited by examiner

SECONDARY BATTERY AND METHOD OF MANUFACTURING SAME

CROSS-REFERENCE TO RELATED APPLICATIONS AND CLAIM OF PRIORITY

This application claims the priority of Korean Patent Application No. 2002-81071, filed in the Korean Intellectual Property Office on Dec. 18, 2002, and Korean Patent Application No. 2002-84073, filed in the Korean Intellectual Property Office on Dec. 26, 2002, the disclosures of which are incorporated herein in their entirety by reference.

BACKGROUND OF THE INVENTION

1. Field of the Invention

The present invention relates to a secondary battery and a method of manufacturing same, and more particularly, to a secondary battery and a method of manufacturing same in which the reliability of a safety device connected to a lead plate is improved.

2. Description of the Related Art

Representative examples of secondary batteries, which are rechargeable and can be manufactured to be small and to have a large capacitance, include nickel-hydrogen (Ni-MH) batteries, lithium batteries, and lithium ion batteries.

Such a secondary battery is manufactured by placing an electrode assembly, which is comprised of a positive electrode plate, a negative electrode plate, and a separator, in a battery case (can) made of aluminum or an aluminum alloy, injecting an electrolyte into the can, and sealing the can. The can made of aluminum or an aluminum alloy, which are lighter than other conductive metals, such as iron, is conducive to the manufacture of lightweight batteries and is resistant to corrosion even when used in a high voltage condition for a long period of time. The secondary battery includes an electrode port formed on the top of the can such that the electrode port is insulated from the can. This electrode port forms a positive electrode or a negative electrode of the battery. The battery can forms the negative electrode of the battery when the electrode port forms the positive electrode and forms the positive electrode when the electrode port forms the negative electrode.

The secondary battery sealed in the can is connected to a safety device, for example, a positive temperature coefficient (PTC) element, such as a positive thermistor, a thermal fuse, a protecting circuit module (PCM), and the like and is then arranged in a battery pack. Such a safety device is connected between the positive electrode and the negative electrode and cuts off a flow of current when the temperature of the battery rises too high or when the voltage of the battery suddenly rises due to overcharging or over-discharging, thereby preventing destruction of the battery.

The safety device is connected between the positive electrode and the negative electrode of the battery by a lead plate. The lead plate is made of nickel, a nickel alloy, or a nickel-plated stainless steel and has a predetermined hardness and conductivity.

U.S. Pat. No. 5,976,729 discloses a cell that improves reliability with a protecting circuit. In this patent, a lead plate made of nickel is previously welded to an external bottom surface of an aluminum can by laser irradiation. Another lead plate is resistance welded to the lead plate made of nickel and is connected to a safety device, such as a PCM, so that the safety device can be protected from laser irradiation.

However, the aluminum can is very thin, so that the intensity of a laser beam applied when welding the lead plate to the bottom surface of the can must be carefully controlled so as to prevent an electrolyte from leaking. In addition, sequentially connecting two lead plates to the bottom surface of the cell lowers working efficiency.

SUMMARY OF THE INVENTION

The present invention provides a secondary battery with a lead plate that is connected to a cap plate or an external bottom surface of a can by pressing, not by welding. Therefore, a safety device can be connected to the lead plate with improved reliability, and there is no leakage of an electrolytic solution caused by laser welding. The secondary battery according to the present invention can be manufactured through fewer, simplified processing steps.

In accordance with an aspect of the present invention, there is provided a secondary battery comprising: an electrode assembly; an electrically conducting can, adapted to accommodate the electrode assembly, the can having a side opening; a cap assembly including a cap plate and an electrode port, the cap plate being coupled to the side opening of the can and having at least one aperture in a side portion thereof, the electrode port being coupled to the cap plate and connected to one of at least two electrode tabs that extend from the electrode assembly; and a lead plate pressed into the at least one aperture of the cap plate and connected to a safety device.

In accordance with another aspect of the present invention, there is provided a secondary battery comprising: an electrode assembly including a positive electrode plate, a negative electrode plate, and a separator interposed between the positive and negative electrode plates; an electrically conducting metallic can, adapted to accommodate both the electrode assembly and an electrolytic solution, the can having a side opening; a cap assembly including a cap plate and an electrode port, the cap plate being coupled to the side opening of the can and having at least one aperture in a side portion thereof, the electrode port being coupled to the cap plate via a gasket that insulates the electrode port from the cap plate and being connected to one of positive and negative electrode tabs that respectively extend from the positive and negative electrode plates; and a lead plate pressed into the at least one aperture of the cap plate and connected to a safety device.

In accordance with still another aspect of the present invention, there is provided a secondary battery comprising: an electrode assembly; an electrically conducting can, adapted to accommodate the electrode assembly, the can having at least one cavity in an external bottom surface thereof and a side opening; a cap assembly coupled to the side opening of the can; and a lead plate pressed into the at least one cavity formed in the external bottom surface of the can and connected to a safety device.

In accordance with yet another aspect of the present invention, there is provided a secondary battery comprising: an electrode assembly including a positive electrode plate, a negative electrode plate, and a separator interposed between the positive and negative electrode plates; an electrically conducting metallic can, adapted to accommodate both the electrode assembly and an electrolytic solution, the can having at least one cavity in an external bottom surface thereof and a side opening; a cap assembly coupled to the side opening of the can; and a lead plate pressed into the at least one cavity formed in the external bottom surface of the can and connected to a safety device.

In accordance with yet another aspect of the present invention, there is provided a method of manufacturing a secondary battery, the method comprising:

forming an electrode assembly; forming an electrically conducting can, the can arranged to accommodate the electrode assembly; forming a side opening in the can; forming a cap assembly including a cap plate and an electrode port; coupling the cap plate to the side opening of the can;
forming at least one aperture in a side portion of the cap plate; coupling the electrode port to the cap plate; connecting the electrode port to one of at least two electrode tabs extending from the electrode assembly; pressing a lead plate into the at least one aperture of the cap plate; and connecting the lead plate to a safety device.

In accordance with still yet another aspect of the present invention, there is provided a method of manufacturing a secondary battery, the method comprising: forming an electrode assembly; forming an electrically conducting can, the can being adapted to accommodate the electrode assembly; forming at least one cavity in an external bottom surface of the can; forming a side opening in the can; forming a cap assembly; coupling the cap assembly to the side opening of the can; pressing a lead plate into the at least one cavity of the can; and connecting the lead plate to a safety device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
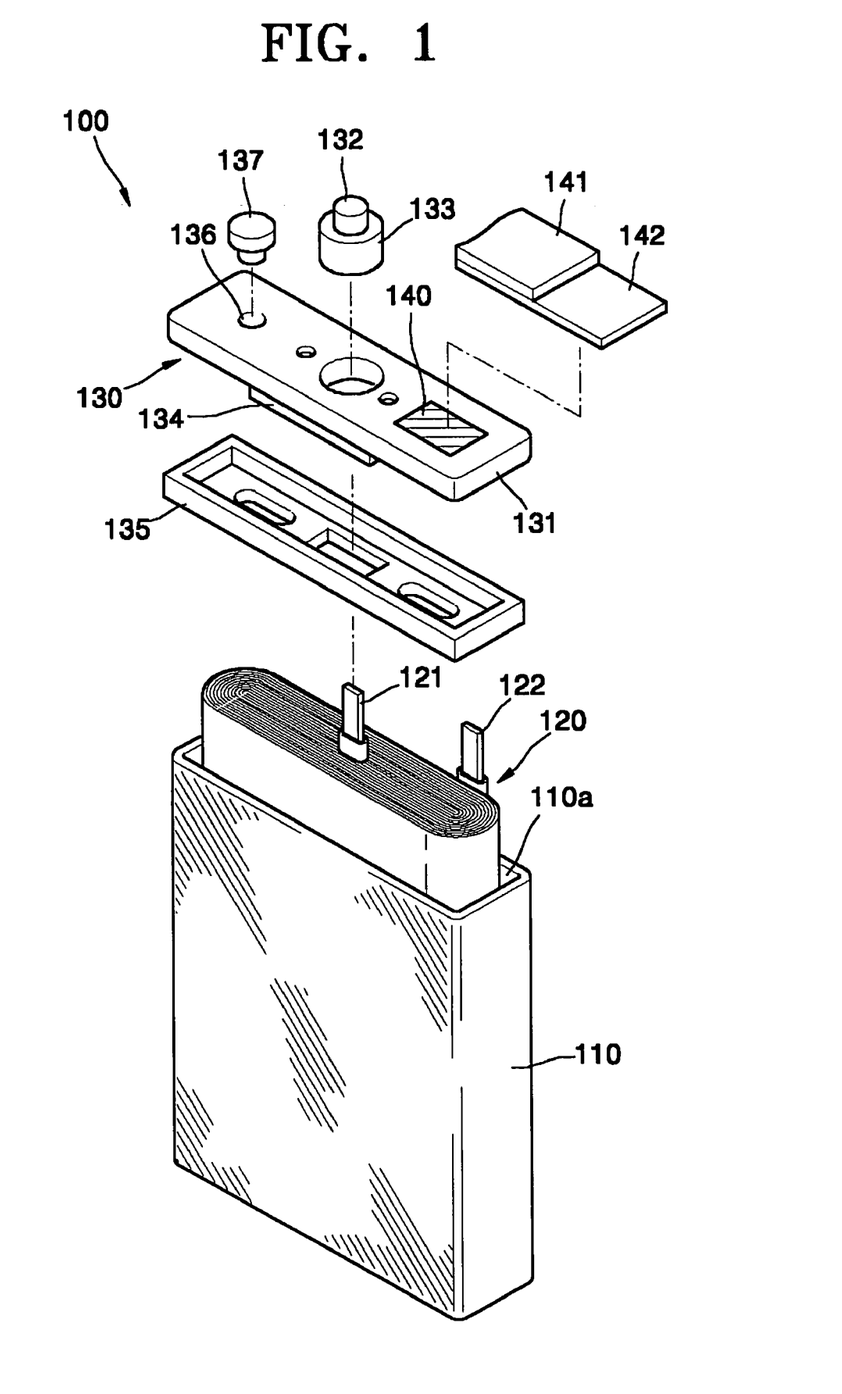
FIG. 1 is an exploded perspective view of a secondary battery according to an embodiment of the present invention.

A secondary battery according to an embodiment of the present invention is shown in FIG. 1. Referring to FIG. 1, a secondary battery 100 according to an embodiment of the present invention includes a can 110 that has a side opening 110a and an electrode assembly 120, which is inserted into the can 110 through the side opening 110a.

The electrode assembly 120 is comprised of a positive electrode plate, a negative electrode plate, and a separator disposed between the positive and negative electrode plates. The electrode assembly 120 may be a jelly-roll type formed by rolling a stack consisting of a positive electrode plate, a separator, and an negative electrode plate, as illustrated in FIG. 1.

The positive electrode plate includes a positive electrode current collector that is a strip of metal foil. The positive electrode current collector may be formed of an aluminum foil. At least one surface of the positive electrode current collector includes a positive electrode coating portion that is coated with a positive electrode composition that contains a positive electrode active material. The positive electrode active material may be a lithium oxide. The positive electrode composition may further include a binder, a plasticizer, a conducting agent, and the like.

The negative electrode plate includes a negative electrode current collector that is a strip of metal foil. The negative electrode current collector may be formed of a copper foil. At least one surface of the negative electrode current collector includes a negative electrode coating portion that is coated with a negative electrode composition that contains a negative electrode active material. The negative electrode active material may be a carbonaceous material. The negative electrode composition may further include a binder, a plasticizer, a conducting agent, and the like.

A negative electrode tab 121 and a positive electrode tab 122 respectively connected to the negative electrode plate and positive electrode plate are drawn out from the electrode assembly 120. The negative electrode tab 121 and the positive electrode tab 122 are respectively welded to the negative electrode plate and the positive electrode plate. The negative electrode tab 121 may be formed of a nickel thin film. The positive electrode tab 122 may be formed of an aluminum thin film. However, examples of materials for the negative electrode tab 121 and the positive electrode tab 122 are not limited to these materials. Unlike the illustration in FIG. 1, the positions of the negative electrode tab 121 and the positive electrode tab 122 can be switched.

The can 110 is made of a metallic material with a substantially rectangular form. Accordingly, the can 110 itself can act as a port. The can 110 may be formed of a lightweight, conductive metal, for example, aluminum or an aluminum alloy. The can 110 has the side opening 110a, allowing the electrode assembly 120 to be inserted into the can 110. The can 110 may have angular edges, as illustrated in FIG. 1. However, the can 110 may have rounded edges or any other shaped edges.

The side opening 110a of the can 110 is sealed with a cap assembly 130. The cap assembly 130 includes a cap plate 131 that is directly welded to the perimeter of the side opening 110a. The can 110 and the cap plate 131 may be made of the same metallic material for easy welding. In other words, the cap plate 131 may be made of aluminum or an aluminum alloy.

A pin-shaped electrode port 132 is fitted into the cap plate 131 of the cap assembly 130 via a gasket 133 by which the electrode port 132 is insulated from the cap plate 131. An insulating plate 134 and a port plate (not shown) may be disposed on a bottom surface of the cap plate 131 to correspond to the electrode port 132 so that the electrode port 132 is insulated from the cap plate 131. The electrode port 132 acts as a negative electrode port by being welded to the negative electrode tab 121 that extends from the negative electrode plate. The positive electrode tab 122 that extends from the positive electrode plate is connected directly to the bottom surface of the cap plate 131 or an internal side of the can 110 so that an external surface of the secondary cell 100 excluding the electrode port 132 acts as a positive electrode port. However, the structures of the positive electrode port and the negative electrode port are not limited to the above. For example, the positive electrode port may be formed as a separate electrode port, like the negative electrode port. The positive electrode port and the negative electrode port may have other various structures.

After the electrode assembly 120 is inserted into the can 110, a protecting case 135 made of an insulating material may be further interposed between the electrode assembly 120 and the cap assembly 130 to more tightly support the electrode assembly 120.

After the cap assembly 130 is welded to the perimeter of the side opening 10a of the can 110, an electrolytic solution is injected via an electrolyte injection hole 136 formed in the cap plate 131, and the electrolyte injection hole 136 is plugged with a plug 137.

Figure 2:
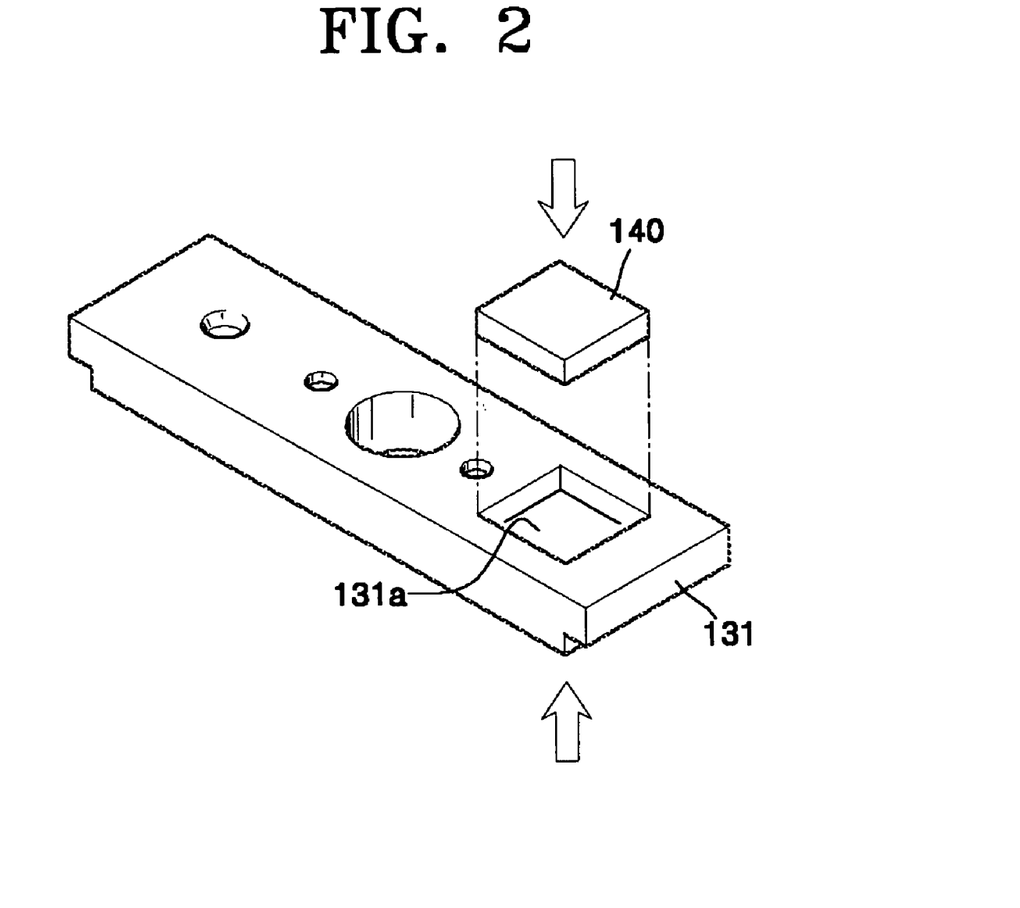
FIG. 2 is a perspective view illustrating the insertion of a lead plate into a cap plate of FIG. 1 by pressing.

As a feature of the secondary battery 100 according to the present invention, a lead plate 140 is fitted into a side portion of the cap plate 131. In particular, as shown in FIG. 2, at least one aperture 131a is formed in the side portion of the cap plate 131. The lead plate 140 having a size that corresponds to the aperture 131a is inserted into the aperture 131a. The aperture 131a may be formed while molding the cap plate 131.

The lead plate 140 may be formed of nickel that has a lower conductivity than the cap plate 131 made of aluminum or an aluminum alloy.

Figure 3:
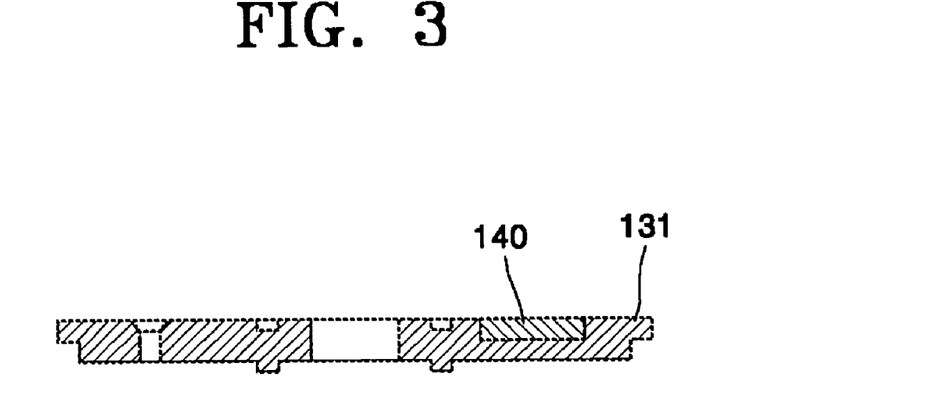
FIG. 3 is a sectional view of the lead plate fitted into the cap plate of FIG. 2.

After the lead plate 140 is inserted into the aperture 131a, which is formed in the side portion of the cap plate 131, the lead plate 140 is pressed against the cap plate 131 by using a general pressing device, for example, a roller, so that the lead plate 140 is tightly coupled into the cap plate 131, as shown in FIG. 3.

The lead plate 140 coupled to the cap plate 131 is connected to a safety device 141, for example, a protecting circuit module (PCM) or a positive temperature coefficient (PTC) element, as illustrated in FIG. 1. A port member 142 is drawn out from the safety device 141. The port member 142 may be made of the same material as the lead plate 140, for example, nickel. The port member 142 may be connected to the lead plate 140 by resistance welding, for example.

As described above, the aperture 131a is formed in the side portion of the cap plate 131, and the lead plate 140 is fitted into the aperture 131a by pressing. In other words, according to the present invention, the lead plate 131 can be coupled to the cap plate 131 by simple pressing, not by welding, such that there is no concern about leakage of an electrolytic solution, thus raising the production yield.

Figure 4:
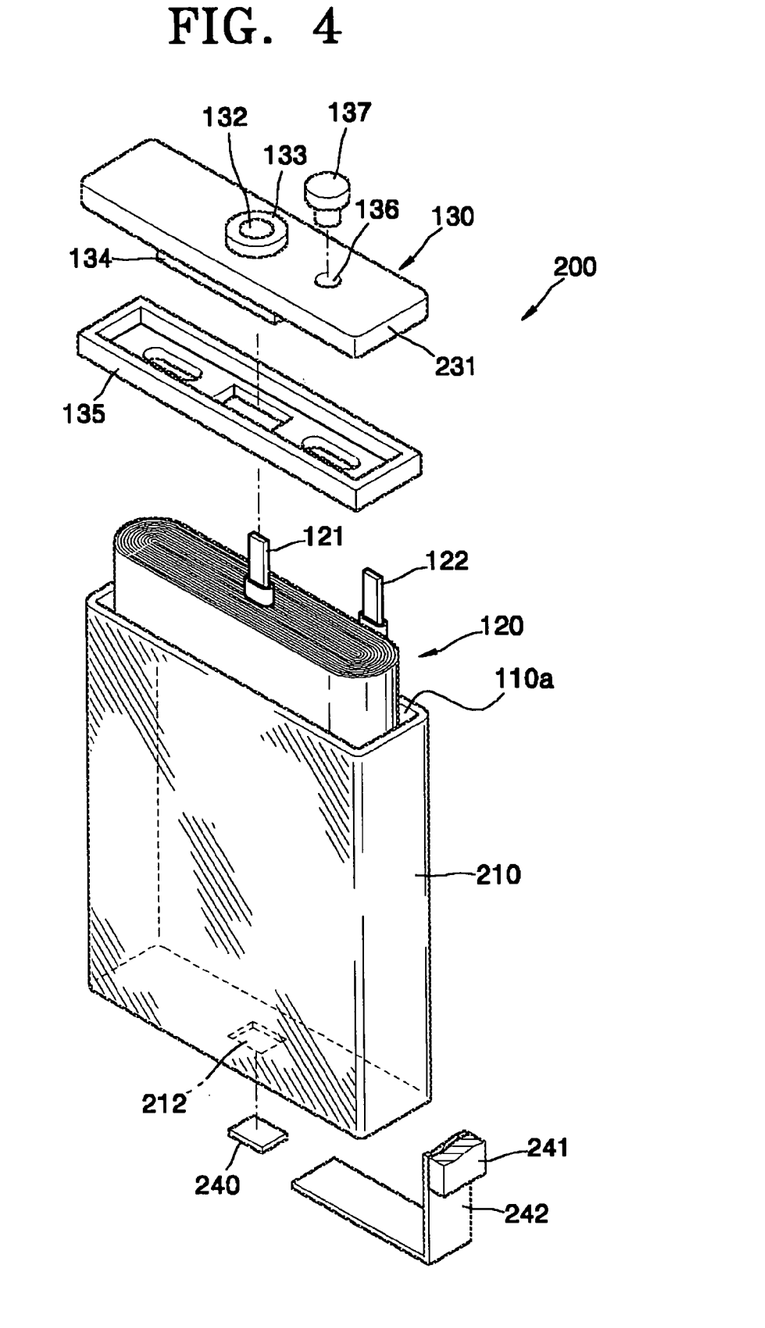
FIG. 4 is an exploded perspective view of a secondary battery according to another embodiment of the present invention.

Since the lead plate 140 is positioned in the cap plate 131, the distance from the lead plate 140 to the electrode port 132 is reduced, suppressing a rise in resistance and improving cell performance. In addition, a more compact battery can be manufactured with the above structure. FIG. 4 is an exploded perspective view of a secondary battery according to another embodiment of the present invention. Elements that are the same as in FIG. 1 are denoted by the same reference numerals, and detailed descriptions thereof will not be provided here.

Referring to FIG. 4, unlike the secondary battery 100 according to the above embodiment of the present invention that has the lead plate 140 in the side portion of the cap plate 131, a secondary battery 200 illustrated in FIG. 4 has a feature in that a lead plate 240 is coupled to an external bottom surface of a can 210, not to a cap plate 231.

In particular, at least one cavity 212 is formed in the external bottom surface of the can 210. The cavity 212 may be formed while molding the can 210 from an aluminum or aluminum alloy plate by deep drawing and using a predetermined protrusion formed in an anvil block that supports the aluminum or aluminum alloy plate.

Figure 5:
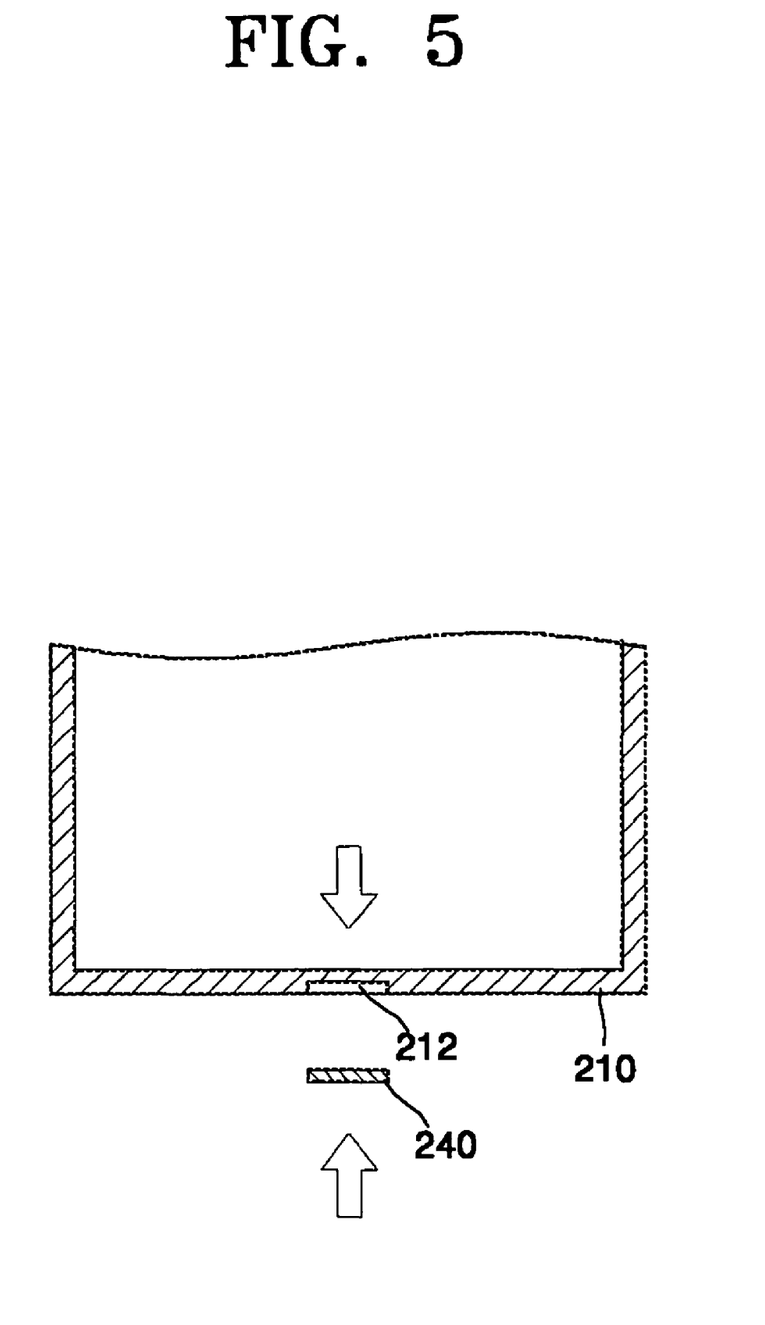
FIG. 5 is a partial sectional view illustrating the insertion of a lead plate into an external bottom surface of a can in FIG. 4 by pressing.

Next, the lead plate 240 is inserted into the cavity 212. The lead plate 240 has a size that corresponds to the cavity 212, as shown in FIG. 5. The lead plate 240 may be made of nickel, which has a lower conductivity than the can 210 made of aluminum or an aluminum alloy.

Figure 6:
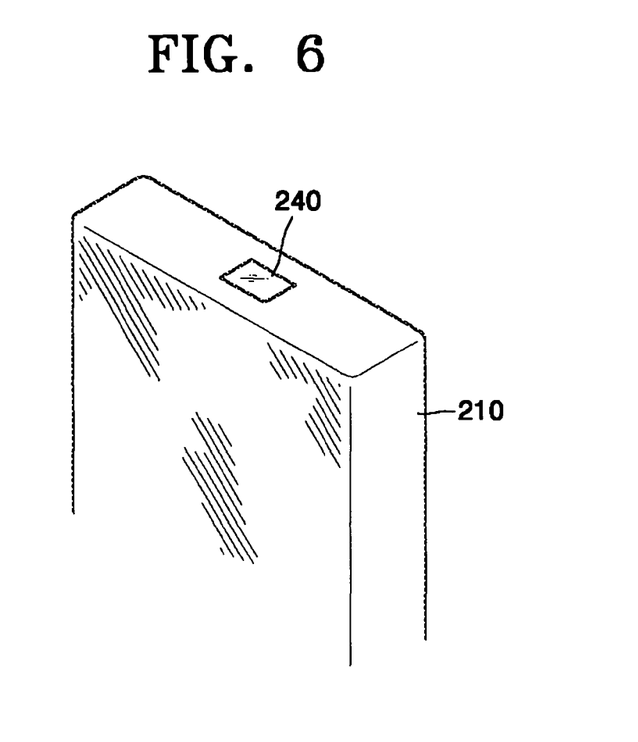
FIG. 6 is a partial perspective view illustrating the external bottom surface of the can into which the lead plate has been fitted.
Figure 7:
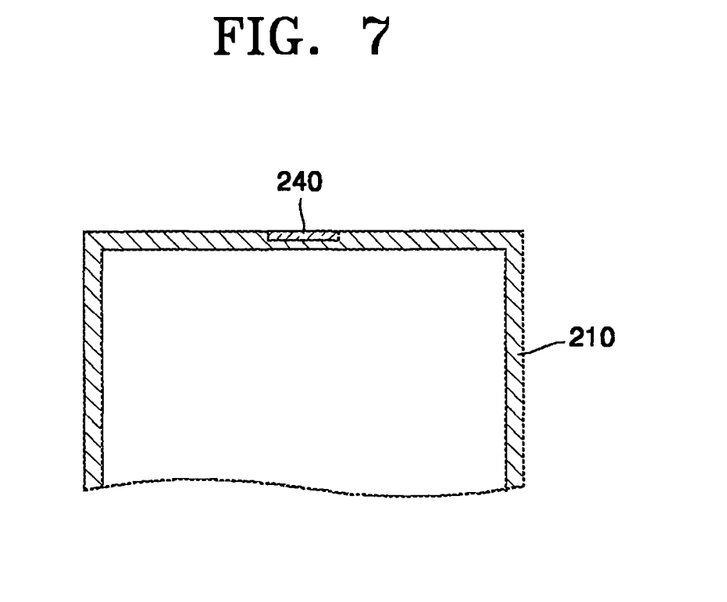
FIG. 7 is a sectional view of FIG. 6.

After the lead plate 240 is inserted into the cavity 212, which is formed in the external bottom surface of the can 210, the lead plate 240 and the external bottom surface of the can 210 are pressed by using a general pressing device, such as a roller, such that the lead plate 240 tightly couples to the cavity 212 and aligns with the external bottom surface of the can 210, as illustrated in FIGS. 6 and 7.

A safety device 241, such as a PCM or a PTC element, is connected to the lead plate 240 that has been fitted into the external bottom surface of the can 210. A port member 242 is drawn out from the safety device 242. The port member 242 may be made of the same material as the lead plate 240, for example, nickel. The port member 242 may be connected to the lead plate 240 by, resistance welding, for example.

As described above, the cavity 212 is formed in the external bottom surface of the can 210, and the lead plate 240 is fitted into the cavity 212 by pressing. In other words, according to the present invention, the lead plate 240 can be coupled to the can 210 by simple pressing, not by welding. Therefore, an electrolytic solution does not leak from the can 210 and the production yield improves.

The secondary batteries according to the present invention described above provide the following effects.

First, the lead plate is coupled to the cap plate or the external bottom surface of the can by pressing, not by welding, so that there is no concern about leakage of an electrolyte caused by conventional laser welding processes. The failure rate of secondary batteries due to welding failures decreases, and the safety device is protected from laser irradiation and has improved reliability.

Second, when the lead plate is coupled to a side portion of the cap plate, the distance from the lead plate 140 to the electrode port 132 is reduced, avoiding a rise in resistance and improving cell performance. In addition, a more compact battery that has a larger design margin can be manufactured with this structure.

Third, when the lead plate is fitted into the cavity formed in the external bottom surface of the can by pressing, it is easier to connect the lead plate with a safety device, thereby improving production yields. In addition, a secondary battery that has a larger design margin can be manufactured with this structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A secondary battery comprising:
   an electrode assembly including a positive electrode plate, a negative electrode plate, and a separator interposed between the positive and negative electrode plates;
   a metallic electrically conducting can, adapted to accommodate both the electrode assembly and an electrolytic solution, the can including a side opening;
   a cap assembly including a cap plate and an electrode port, the cap plate being coupled to the side opening of the can, the electrode port being coupled to the cap plate via a gasket adapted to insulate the electrode port from the cap plate, the electrode port being connected to one of positive and negative electrode tabs respectively extending from the positive and the negative electrode plates;
   a selected one of: the cap assembly having at least one aperture in a side portion thereof, and the can having at least one cavity in an external bottom surface; and
   a lead plate having an upper flat surface and a lower flat surface, the upper flat surface and the lower flat surface having sizes corresponding to the aperture and the cavity,
   wherein the lead plate is pressfit into a selected one of:
   the at least one aperture of the cap plate, and
   the at least one cavity in an external bottom surface of the can, and the lead plate is tightly attached by an interference fit without welding to the selected one of the at least one aperture of the cap plate and the at least one cavity in an external bottom surface of the can and is adapted to be connected to a safety device, and wherein one of the upper flat surface and the lower flat surface is disposed in the aperture or the cavity.

2. The secondary battery of claim 1, wherein the cap plate comprises one of aluminum and an aluminum alloy.

3. The secondary battery of claim 1, wherein the lead plate comprises nickel.

4. The secondary battery of claim 1, wherein the lead plate and the safety device are connected via a port member, the port member being resistance welded to the lead plate.

5. The secondary battery of claim 4, wherein the port member comprises nickel.

6. The secondary battery of claim 1, further comprising a protecting case arranged between the electrode assembly and the cap assembly.

7. A secondary battery comprising:
an electrode assembly including a positive electrode plate, a negative electrode plate, and a separator interposed between the positive and negative electrode plates;
a metallic electrically conducting can, adapted to accommodate the electrode assembly and an electrolytic solution, the can having at least one cavity in an external bottom surface thereof and having a side opening;
a cap assembly adapted to be coupled to the side opening of the can; and
a lead plate having an upper flat surface and a lower flat surface, one of the upper flat surface and the lower flat surface having sizes corresponding to the cavity,
wherein the lead plate is pressfit into the at least one cavity of the can, the lead plate being tightly attached by an interference fit without welding or an adhesive to the at least one cavity of the can and being connected to a safety device, and
wherein one of the upper flat surface and the lower flat surface is disposed in the cavity.

8. The secondary battery of claim 7, wherein the can comprises one of aluminum and an aluminum alloy.

9. The secondary battery of claim 7, wherein the lead plate comprises nickel.

10. The secondary battery of claim 7, wherein the lead plate and the safety device are connected via a port member, the port member being resistance welded to the lead plate.

11. The secondary battery of claim 10, wherein the port member comprises nickel.

12. The secondary battery of claim 7, wherein the cap assembly comprises:
a cap plate adapted to be coupled to the side opening of the can; and
an electrode port adapted to be coupled to the cap plate via a gasket adapted to insulate the electrode port from the cap plate, the electrode port being connected to one of positive and negative electrode tabs respectively extending from the positive and negative electrode plates.

13. A secondary battery comprising:
an electrode assembly including at least two electrode tabs extending therefrom;
an electrically conducting can, adapted to accommodate the electrode assembly, the can including a side opening;
a cap assembly including a cap plate and an electrode port, the cap plate being coupled to the side opening of the can and having at least one aperture in a side portion thereof, the electrode port being connected to one of the at least two electrode tabs, and
a lead plate having an upper flat surface and a lower flat surface, the upper flat surface and the lower flat surface having sizes corresponding to the aperture,
wherein the lead plate is pressfit into the at least one aperture of the cap plate, and the lead plate being tightly attached by an interference fit without welding or an adhesive to the at least one aperture of the cap plate and adapted to be connected to a safety device, and
wherein one of the upper flat surface and the lower flat surface is disposed in the aperture.

14. The secondary battery of claim 13, wherein the cap plate comprises one of aluminum and an aluminum alloy.

15. The secondary battery of claim 13, wherein the lead plate comprises nickel.

16. The secondary battery of claim 13, wherein the lead plate and the safety device are connected via a port member welded to the lead plate.

17. The secondary battery of claim 16, wherein the port member comprises nickel.

18. The secondary battery of claim 13, further comprising a protecting case arranged between the electrode assembly and the cap assembly.

19. A secondary battery comprising:
an electrode assembly;
an electrically conducting can, adapted to accommodate the electrode assembly, the can having at least one cavity in an external bottom surface thereof and having a side opening;
a cap assembly adapted to be coupled to the side opening of the can; and
a lead plate having an upper flat surface and a lower flat surface, one of the upper flat surface and the lower flat surface having sizes corresponding to the cavity,
wherein the lead plate is pressfit into the at least one cavity of the can, the lead plate being tightly attached by an interference fit without welding to the at least one cavity in an external bottom surface of the can and being connected to a safety device, and
wherein one of the upper flat surface and the lower flat surface is disposed in the cavity.

20. The secondary battery of claim 19, wherein the can comprises one of aluminum and an aluminum alloy.

21. The secondary battery of claim 19, wherein the lead plate comprises nickel.

22. The secondary battery of claim 19, wherein the lead plate and the safety device are connected via a port member welded to the lead plate.

23. The secondary battery of claim 22, wherein the port member comprises nickel.

24. The secondary battery of claim 19, wherein the cap assembly comprises:
a cap plate adapted to be coupled to the side opening of the can; and
an electrode port adapted to be coupled to the cap plate and connected to one of at least two electrode tabs extending from the electrode assembly.

25. A method of manufacturing a secondary battery, the method comprising:
forming an electrode assembly;
forming an electrically conducting can, the can arranged to accommodate the electrode assembly;
forming a side opening in the can;
forming a cap assembly including a cap plate and an electrode port;
coupling the cap plate to the side opening of the can;
forming at least one aperture in a side portion of the cap plate;
coupling the electrode port to the cap plate;
connecting the electrode port to one of at least two electrode tabs extending from the electrode assembly;
pressfitting a lead plate having an upper flat surface and a lower flat surface, the upper flat surface and the lower flat surface having sizes corresponding to the aperture, into the at least one aperture of the cap plate to tightly attach the lead plate by an interference fit without welding to the at least one aperture of the cap plate; and connecting the lead plate to a safety device, wherein one of the upper flat surface and the lower flat surface is disposed in the aperture.

26. The method of claim 25, further comprising forming the cap plate of one of aluminum and an aluminum alloy.

27. The method of claim 25, further comprising forming the lead plate of nickel.

28. The method of claim 25, further comprising connecting the lead plate to the safety device with a port member welded to the lead plate.

29. The method of claim 28, further comprising forming the port member of nickel.

30. The method of claim 25, further comprising forming a protecting case between the electrode assembly and the cap assembly.

31. A method of manufacturing a secondary battery, the method comprising:

forming an electrode assembly;

forming an electrically conducting can, the can being adapted to accommodate the electrode assembly;

forming at least one cavity in an external bottom surface of the can;

forming a side opening in the can;

forming a cap assembly;

coupling the cap assembly to the side opening of the can;

pressfitting, by an interference fit, a lead plate having an upper flat surface and a lower flat surface, one of the upper flat surface and the lower flat surface having sizes corresponding to the cavity, into the at least one cavity of the can to tightly attach the lead plate without welding to the at least one cavity of the can; and connecting the lead plate to a safety device, wherein one of the upper flat surface and the lower flat surface is disposed in the cavity.

32. The method of claim 31, further comprising forming the can of one of aluminum and an aluminum alloy.

33. The method of claim 31, further comprising forming the lead plate of nickel.

34. The method of claim 31, further comprising connecting the lead plate to the safety device with a port member welded to the lead plate.

35. The method of claim 34, further comprising forming the port member of nickel.

36. The method of claim 31, further comprising:

forming the cap assembly to include a cap plate coupled to the side opening of the can;

forming the cap assembly to include an electrode port coupled to the cap plate; and connecting the electrode port to one of at least two electrode tabs extending from the electrode assembly.

* * * * *